US008903883B2

(12) United States Patent
Kumar et al.

(10) Patent No.: US 8,903,883 B2
(45) Date of Patent: Dec. 2, 2014

(54) APPARATUS, SYSTEM, AND METHOD FOR PATTERN-BASED ARCHIVING OF BUSINESS EVENTS

(75) Inventors: Rajan Kumar, Tamilnadu (IN); Deepa Rao Koppa V, Kanataka (IN)

(73) Assignee: International Business Machines Corporation, Armonk, NY (US)

( * ) Notice: Subject to any disclaimer, the term of this patent is extended or adjusted under 35 U.S.C. 154(b) by 2688 days.

(21) Appl. No.: 11/420,183

(22) Filed: May 24, 2006

(65) Prior Publication Data

US 2007/0276883 A1 Nov. 29, 2007

(51) Int. Cl.
*G06F 15/16* (2006.01)
*G06F 11/00* (2006.01)
*G06F 9/44* (2006.01)
*G06F 11/34* (2006.01)
*G06F 9/54* (2006.01)

(52) U.S. Cl.
CPC .............. *G06F 11/3495* (2013.01); *G06F 8/36* (2013.01); *G06F 8/71* (2013.01); *G06F 2201/86* (2013.01); *G06F 9/542* (2013.01); *G06F 2201/835* (2013.01); *G06F 11/3447* (2013.01)
USPC ............................................ 709/201; 714/57

(58) Field of Classification Search
USPC ......................................................... 709/201
See application file for complete search history.

(56) References Cited

U.S. PATENT DOCUMENTS

| 6,523,027 | B1 | 2/2003 | Underwood | 707/4 |
| 6,609,128 | B1 | 8/2003 | Underwood | 707/10 |
| 6,640,238 | B1* | 10/2003 | Bowman-Amuah | 709/201 |
| 6,678,705 | B1* | 1/2004 | Berchtold et al. | 1/1 |
| 2002/0122543 | A1 | 9/2002 | Rowen | 379/93.01 |
| 2003/0208608 | A1 | 11/2003 | Merriam | 709/229 |
| 2004/0064511 | A1* | 4/2004 | Abdel-Aziz et al. | 709/206 |
| 2004/0088681 | A1 | 5/2004 | Berg et al. | 717/120 |
| 2005/0283461 | A1 | 12/2005 | Sell et al. | 707/1 |
| 2006/0010213 | A1 | 1/2006 | Mehta | 709/206 |
| 2006/0010322 | A1 | 1/2006 | Novack et al. | 713/170 |
| 2006/0015544 | A1 | 1/2006 | Kodama | 707/204 |
| 2007/0283194 | A1* | 12/2007 | Villella et al. | 714/57 |

OTHER PUBLICATIONS

IBM Tivoli Storage Manager Version 5.3 Technical Guide pp. 124-135, 152-159, 285-295, Feb. 14, 2005.
Majordomo Administrators' Manual—retrieved Feb. 17, 2006 http://support.ica.apc.orq/ml/mj_admin.html.en.

* cited by examiner

*Primary Examiner* — Brian P Whipple
*Assistant Examiner* — James Edwards
(74) *Attorney, Agent, or Firm* — Kunzler Law Group

(57) ABSTRACT

An apparatus, system, and method are disclosed for pattern-based archiving of business events on a middleware server. The method performs pattern-based archiving of business events on a middleware server by: interpreting a user-specified naming pattern for labeling event archive structures, each event archive structure corresponding to an event; detecting the occurrence of a middleware event triggered by a business process; generating an archive filename based on the user-specified naming pattern, the filename comprising data from the event; and providing the filename to an event storage module for saving an archive file with the filename. The archiving method allows users to review archived files such that the filename provides a context for the archive document, and users can more easily find specific documents.

32 Claims, 8 Drawing Sheets

APPARATUS, SYSTEM, AND METHOD FOR PATTERN-BASED ARCHIVING OF BUSINESS EVENTS

BACKGROUND OF THE INVENTION

1. Field of the Invention

This invention relates to the archiving of business events and more particularly relates to archiving business events according to a user-specified naming pattern.

2. Description of the Related Art

Application integration has emerged as a key e-business technology for providing integrated customer solutions arising from the need to share application data among multiple customer applications. For example, WebSphere Process Server (WPS) from IBM of Armonk, N.Y., may be part of a WebSphere integration system that enables data flow between disparate data stores and applications. The exchange of data is typically bi-directional, metadata driven, and encapsulated in business events known as business objects. A business object typically includes a set of attributes that represent a business entity (such as Employee) and an action on the data (such as a create or update operation).

The component of a WebSphere business integration system that integrates data among heterogeneous applications is typically referred to as an integration broker or integration server. An integration server typically provides a variety of services that include the ability to route data, a repository of rules that govern the integration process, connectivity to a variety of applications, and administrative capabilities that facilitate integration.

WebSphere Interchange Server also enables users to create business processes using a process design tool. A business process defines how the business events that are passing through the system should be handled. A need exists for business events passing through the system to be archived. Event archival allows a user to refer back to processed events when the user faces business integration issues during the workflow, to verify failed business events and check for the cause of failure, and to keep a count of the number of business events processed. Conventional technology stores business events using a name that includes a unique identification (ID) key associated with the event. This provides a convenient method to ensure that archive files have unique names and naming conflicts do not result. However, these unique IDs are typically long strings that have not relationship to the content contained in the archived event. A user trying to find an archive file often needs to find the file in respect to a specific context—like a business event that occurred at a specific time or relates to particular content for example email archive events to a particular recipient.

While tools may be built to provide more contextual information about the archived event, the user may prefer to use standard file system browsing tools to locate and archived event of interest. Unfortunately, this requires that each event be opened and examined until the proper archived event is located. This increases the time required to find the archived event of interest. In addition, the user may desire to define how the archived events are named. Conventional tools do not allow such flexibility.

From the foregoing discussion, it should be apparent that a need exists for an apparatus, system, and method that provides for the archiving of business events where a reviewer can immediately see the context of the business event on the name of the archive file or document. Beneficially, such an apparatus, system, and method would allow the user to specify the type of content that goes into creating the name of the archive file, so the file can be named in a pattern reflecting the context of the business event that the reviewer will wish to see at the time of review.

SUMMARY OF THE INVENTION

The present invention has been developed in response to the present state of the art, and in particular, in response to the problems and needs in the art that have not yet been fully solved by currently available business event monitoring systems. Accordingly, the present invention has been developed to provide a computer programmed product and method for non-intrusively monitoring business events that overcome many or all of the above-discussed shortcomings in the art.

An apparatus is provided with modules to functionally execute pattern-based archiving of business events. The events may comprise middleware events triggered by a business process in communication with the apparatus. The events may comprise content represented in the form of a business object, an e-mail, or a file. The modules in the described embodiments include a customization module, a naming module, an archival module, an event detection module, an event handler module, and a labeling module.

The customization module, in one embodiment, is configured to interpret a user-specified naming pattern for labeling event archive structures. The customization module may be further configured to receive a user-specified naming pattern comprising a pattern definition, a delimiter, and at least one event data field selected by a user from a set of event data fields. The members of the set of event data fields may be a business object name, a business object attribute, a message header field, a value calculated to identify a discussion thread relating a group of e-mails, a primary word from a message header field, and/or a time stamp.

The naming module, in one embodiment, is configured to generate an event archive structure label according to the user-specified naming pattern. An event archive structure label may comprise a filename, an index to a database record, or a memory location within a memory system. The event archive structure label may also comprise a field or fields in an e-mail configured to convey information to a reviewer of archived e-mails. The event archive structure label may contain event data from the event to be archived. The event archive structure may also be configured to be human readable. The naming module may be further configured to add a unique identifier to the event archive structure label. In one embodiment, the naming module may be further configured to add an event failure indicator to the event archive structure label for events having at least one failure.

The archival module may be configured to store the event archive structure with the event archive structure label. The event archive structure may be an archive file, a stored e-mail, an entry in a database, or an entry in a spreadsheet. The labeling module may be configured, in one embodiment, to apply the event archive structure label to the event archive structure.

The event detection module may be configured to detect the occurrence of a middleware event. The event handler module may be configured, in one embodiment, to process the middleware event, and to provide the middleware event to the naming module for archiving in accordance with the present invention.

In one embodiment, a computer program product is presented including the logic to perform pattern-based event archival in accordance with the present invention. The computer program product may have operations comprising interpreting a user-specified naming pattern for labeling event archive structures, each event archive structure corresponding to an event. The operations may further include detecting the occurrence of a middleware event triggered by a business process, and generating an event archive structure label according to the user-specified naming pattern, the event archive structure label comprising data of the event. The operations may also include providing the event archive structure label to an event storage module for labeling of the event archive structure corresponding to the middleware event.

In one embodiment, the operations may further comprise processing the event by way of a middleware component. The operations may include labeling the event archive structure based on the event archive structure label, and storing the event archive structure. The operations may further include receiving the user-specified naming pattern, wherein the user-specified naming pattern comprises a pattern definition, a delimiter, and at least one event data field selected by a user from a set of event data fields. The operations may further comprise adding a unique identifier to the event archive structure label.

A computer program product is also presented including the logic to enhance reviewing of e-mails in accordance with the present invention. The computer program product may have operations comprising interpreting a user-specified naming pattern for review of received e-mails, determining a presentation format for a received e-mail based on the user-specified naming pattern, and presenting the received e-mail according to the presentation format. In one embodiment, the presentation format may comprise ordering several fields of the received e-mails in an order corresponding to the user-specified naming pattern. In an alternate embodiment, the presentation format may comprise computing a label for a presenting field for the e-mails, inserting the presenting field as a new field to the e-mails, and displaying the e-mails with the computed presenting field highlighted. In one embodiment, the computer program product may be utilized with e-mails satisfying the POP3 or IMAP protocols.

A system is presented for pattern-based archival of business events in accordance with the present invention. The system may comprise an integration broker coupled to a source application by way of a first integration adapter, and coupled to a destination application by way of a second integration adapter. The system may comprise a middleware event triggered by the source application. The second integration adapter may be configured to receive the middleware event from the integration broker, and the second integration adapter may include an apparatus with modules to functionally execute the steps of pattern-based archiving of business events. The modules in the described embodiments include a customization module, a naming module, an archival module, an event detection module, an event handler module, and a labeling module.

A method is presented to enhance event archival. The method in the disclosed embodiments includes installing an archive file naming tool on an integration adapter, and executing the archive file naming tool. The archive file naming tool may perform the operations of interpreting a user-specified naming pattern for labeling event archive structures, generating an event archive structure label according to the user-specified naming pattern, and labeling the event archive structure based on the event archive structure label.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
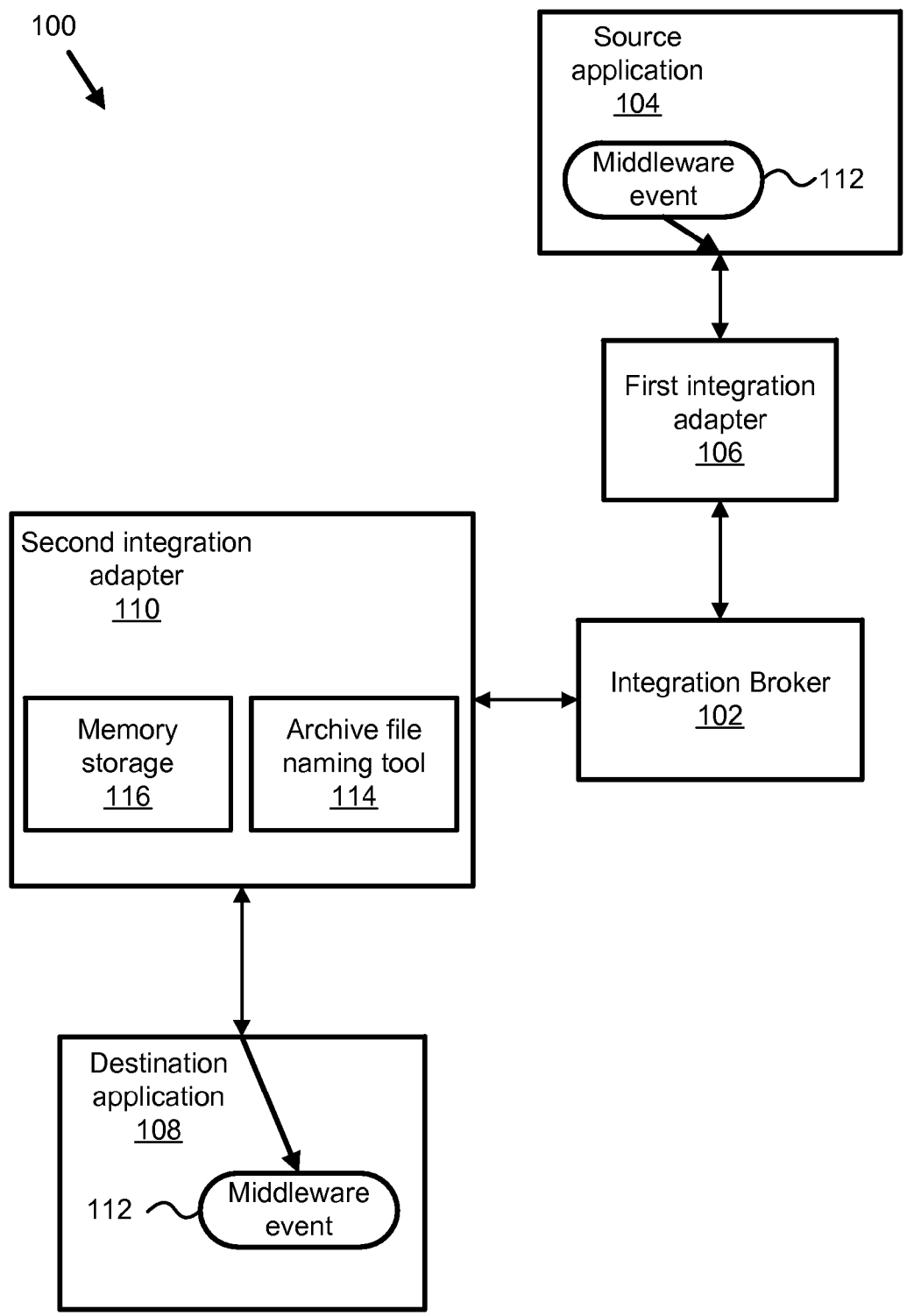
FIG. 1 is a schematic block diagram depicting one embodiment of a system for pattern-based archiving of business events in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of causing execution of a program of machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram depicting one embodiment of a system 100 for pattern-based archiving of business events in accordance with the present invention. A business event may include content represented in the form of an e-mail, a business object, or a file. A business event may be a middleware event 112 triggered by a source application 104 and passed to a destination application 108. The source application 104 and destination application 108 may be business processes or portions of business processes. The middleware event 112 may be passed through an integration broker 102, which may be an integration server. The integration broker 102 may communicate with the source application 104 through a first integration adapter 106, and the integration broker 102 may communicate with the destination application 108 through a second integration adapter 110.

The second integration adapter 110 may be configured to receive the event 112 from the integration broker 102. The second integration adapter 110 may comprise an apparatus for enhancing event archiving, where the apparatus may comprise an archive file naming tool 114.

In one embodiment, the second integration adapter 110 may archive the middleware event 112 after processing the event 112 and before passing the event 112 to the destination application 108. Archiving the event 112 may comprise saving a file representative of the event, saving the event directly, adding the event as an entry to a log file, saving the event in a database, and other known archival techniques. The system 100 may further include a memory storage 116 configured to store the archive of events or metadata about the archive. Metadata about the archive might include, for example, memory locations where archival documents are stored.

Figure 2:
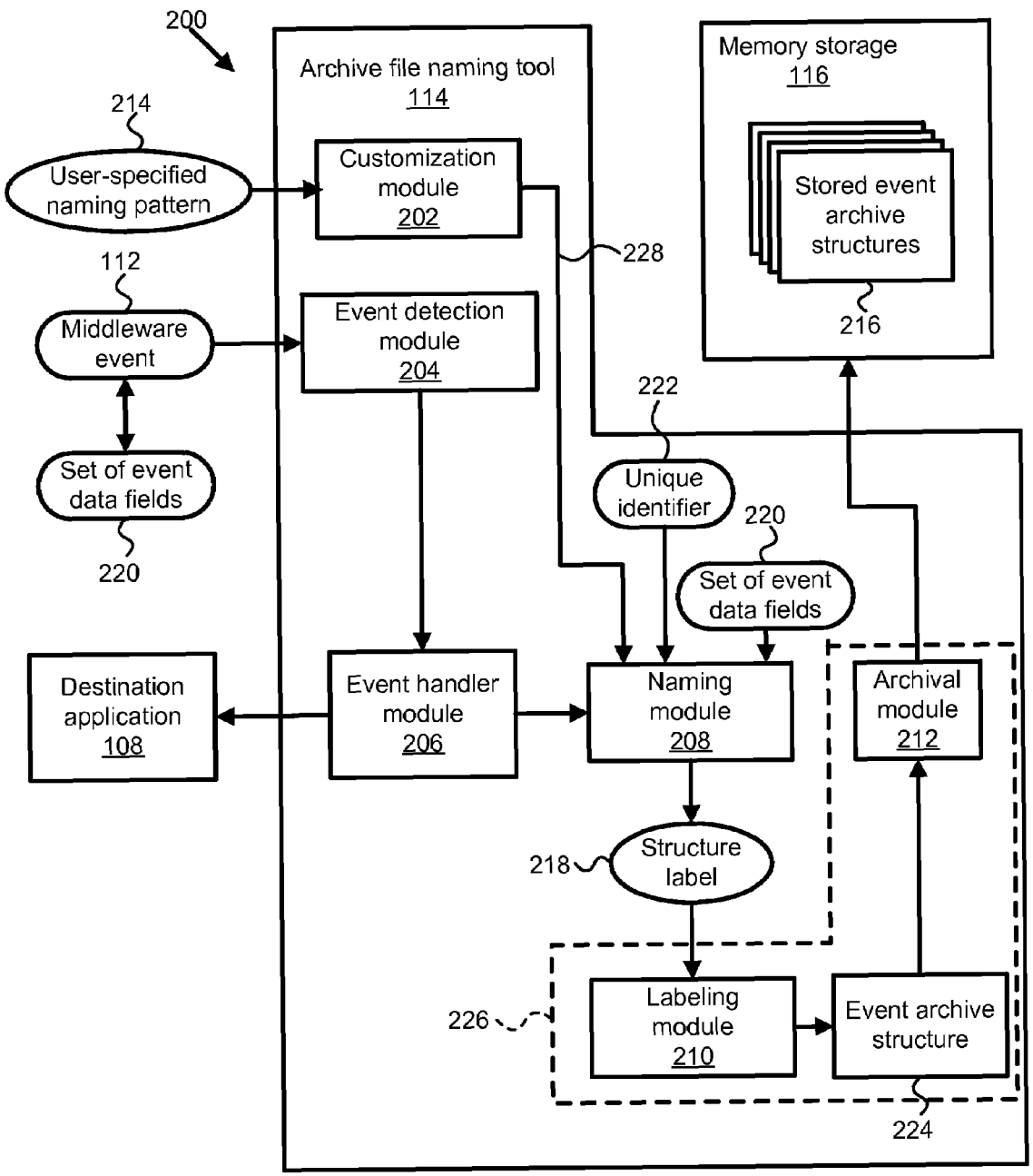
FIG. 2 is a schematic block diagram depicting one embodiment of an apparatus for pattern-based archiving of business events in accordance with the present invention.

FIG. 2 is a schematic block diagram depicting one embodiment of an apparatus 200 for pattern-based archiving of business events in accordance with the present invention. The apparatus 200 may comprise an archive file naming tool 114. The tool 114 may include a customization module 202 configured to interpret a user-specified naming pattern 214 for labeling event archive structures 216. The user-specified naming pattern 214 defines the format and structures of labels or names of the event archive structures 216. The user-specified naming pattern 214 allows a user to specify the name or label of the event archive structures 216 to allow easy sorting and finding of event archive structures 216 at a later time. The customization module 202 may communicate 228 the user-specified naming pattern 214 to a naming module 208.

The user-specified naming pattern 214 may include a pattern definition, a delimiter, and at least one event data field selected by the user from a set of event data fields for the event 112. The pattern definition defines which of the set of event data fields 220 to select values from for generating the name or label of an associated event archive structure 216, and may further define the order in which the selected values appear. For example, a user may select the event data fields "sender" and "time stamp" for archiving e-mails, the pattern definition may comprise placing the "time stamp" first and the "sender" second, and the delimiter may be an underscore "_". In the example, when an event from "Dave" is sent at "13:30," the label of the archive structure 216 is "Dave_13:30." In the example, the user has defined a user-specified naming pattern 214 comprising a pattern definition, a delimiter, and at least one event data field selected from a set of event data fields 220 for the event.

In one embodiment, the set event data fields 220 comprise metadata of the event, such as the sender and time stamp as described above. Alternatively, the set of event data fields 220 may comprise any fields or attributes associated with the event, and these attributes may be in the event itself or provided from other sources. For example, the set of event data fields 220 may comprise a business object name, a business object attribute, a message header field, and a time stamp.

The event data stored in the set of event data fields 220 may further comprise a subject line, sender information, a primary word from a subject line, and a value calculated to identify a discussion thread relating a group of e-mails. For example, a primary word may be determined from the subject according to word length, a list of keywords, and the like. A value calculated to identify a discussion thread relating a group of e-mails may comprise a determination that a group of e-mails contain similar subject matter, or a determination that a group of e-mails consists of the same chain of replies. The calculated value may comprise a unique value assigned to a field of the related e-mails.

The event archive structures 216 may comprise a set of files, a set of entries in a database, a set of locations in a spreadsheet, or a set of memory locations on a memory storage device. The stored event archive structures 216 may also comprise a set of stored e-mails.

The archive file naming tool 114 may further comprise an event detection module 204 configured to detect the occurrence of a middleware event 112. The event detection module 204 may be further configured to trigger an event handler module 206, and pass the event 112 to the event handler module 206. The event handler module 206 may process the event 112, and send the event to a naming module 208. The event handler module 206 may also send the processed event 112 to a destination application 108.

The naming module 208 may be configured to generate an event archive structure label 218 according to the user-specified naming pattern 214. The naming module 208 may use the user-specified naming pattern 214 as interpreted by the customization module 202 to generate the event archive structure label 218. The event archive structure label 218 may comprise selected event data from the set of event data fields 220 of the event 112. The naming module 208 may be further configured to add a unique identifier 222 to the event archive structure label 218. In some embodiments, the unique identifier 222 may be included with the user-specified naming pattern 214 and not separate as illustrated in FIG. 2. The unique identifier 222 may be a unique identifying value that is associated with the event 112, it may be a value generated by the second integration adapter 110 to identify a particular instance of the event 112, or it may be an event data field from the set of event data fields 220.

The naming module 208 may be configured to adjust the event archive structure label 218 in specific embodiments. The naming module 208 may be configured to enforce label limitations as required by the specific embodiment of the invention. For example, the naming module 208 may restrict the usage of special characters within the event archive structure label 218, or limit the total length of the label 218. In a further example, if the naming module 208 shortens the label 218, perhaps to enforce a filename length limitation of a file or operating system, the naming module 208 may assign a specified number of characters to the time stamp segment of the label 218, and a specified number of characters to the sender segment of the label 218.

The naming module 208 may adjust the event archive structure label 218 to maximize the utility of the label 208. For example, the naming module 208 may be configured to standardize the format of certain event data, such as putting a time stamp into a standardized format. In another example, the naming module 208 may be configured to shorten event data fields in a logical manner, including truncating the field to a specified length, preferentially removing low value characters such as spaces, and the like.

The structure label 218 may comprise a filename, an index to a database record, a location within a spreadsheet, a memory location for a memory storage system, or the like. In one embodiment, the naming module 208 may be configured to add an indicator to the event archive structure label 218 indicating whether the event 112 is a failed or successfully processed event 112. In one example, the events 112 comprise customer orders. Customer orders 112 in which the order is successfully processed may be archived in a file with a filename beginning with the letter "s," where customer orders where the order fails may be archived in a file with a filename beginning with the letter "f." In one embodiment, the structure label 218 is human-readable. As used here, human-readable indicates that the label is configured to provide information to a human reader by seeing the label in its native format. For example, a human reader may be able to tell the time of a set of events 112 by looking through a list of structure labels 218 for those events 112, and thereby quickly find an event 112 that occurred at a specific time.

The archive file naming tool 114 may further comprise a labeling module 210 configured to label the event archive structure 224 for the event 112 based on the structure label 218. Labeling the event archive structure 224 for the event 112 may comprise naming an archive file, placing the structure 224 in a certain memory location according to the structure label 218, placing a specific record in a database based on the structure label 218, or other activities that reflect the type of structure label 218 and the type of event archive structure 224 used in the specific embodiment of the invention.

The archive file naming tool 114 may further comprise an archival module 212 configured to store the event archive structure 224. The archival module 212 may store the structure 224 in a memory storage 116 area with a set of stored event archive structures 216. Storing a structure 224 may comprise saving a file, backing up a database, moving an e-mail to an archived e-mails location, and other activities that reflect the type of event archive structure 224 used in the specific embodiment of the invention.

In one embodiment, the labeling module 210, event archive structure 224, and archival module 212 may be grouped into an event storage module 226.

Figure 3:
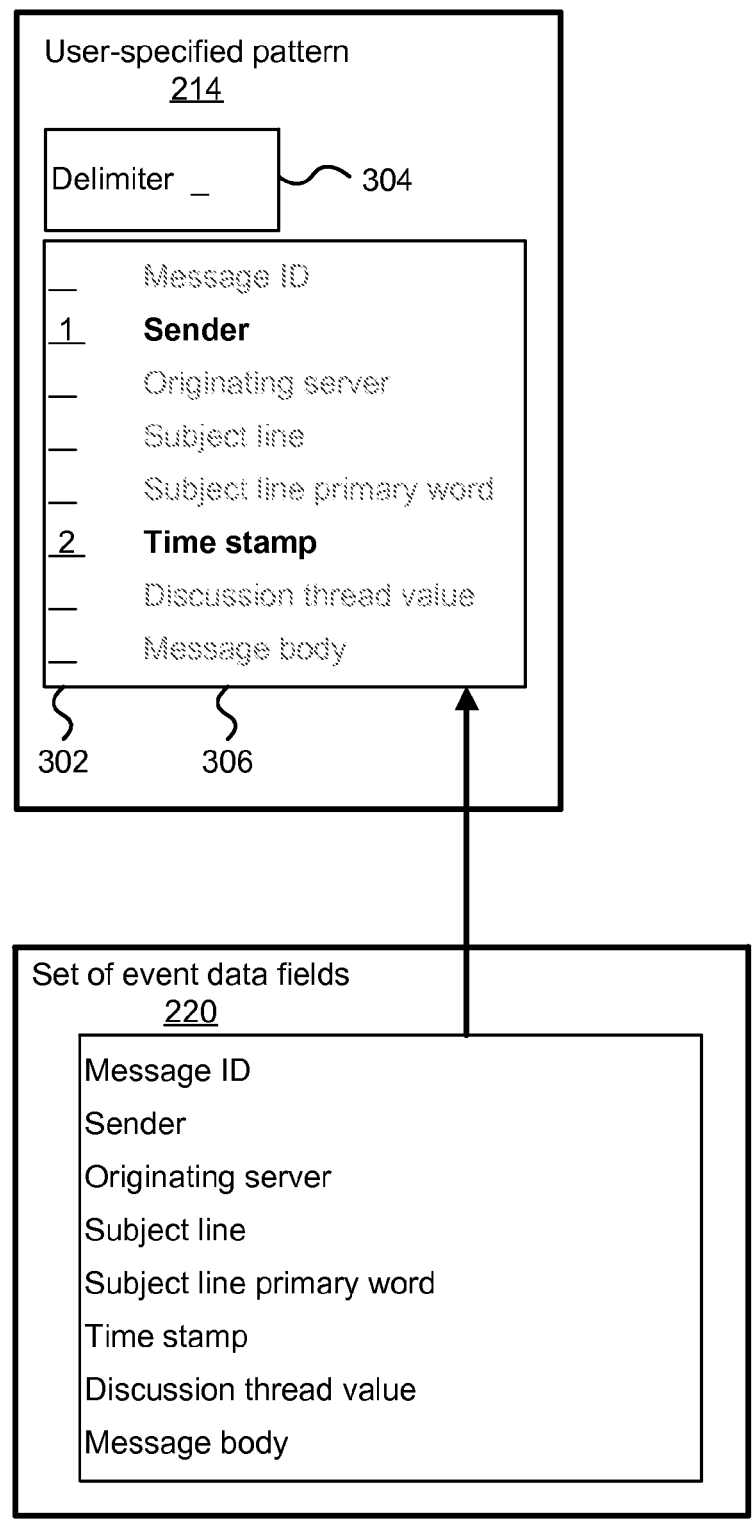
FIG. 3 is a schematic block diagram depicting one embodiment of a user-specified naming pattern in accordance with the present invention.

FIG. 3 is a schematic block diagram depicting one embodiment of a user-specified naming pattern 214 in accordance with the present invention. The user-specified naming pattern 214 may comprise a pattern definition 302, a delimiter 304, and at least one event data field 306 selected from a set of event data fields 220. The pattern definition 302 may define a list of the event data fields 306 which should comprise the event archive structure label 218, and the order in which the event data fields 306 should appear. The pattern definition 302 may further comprise a file type for the event archive structure 224 which may be used by the naming module 208 to set a filename extension, for example "XML." The delimiter 304 may be a default character or set of characters which may appear between each segment of the event archive structure label 218. Alternatively, the delimiter 304 may be selected for each segment of the event archive structure label 218, which may help a user readily identify the information contained within each segment of the event archive structure label 218. A user may select or define any desired delimiter 304.

As depicted in the embodiment of FIG. 3, the pattern definition 302 defines that the list of event data fields "Sender" and "Time stamp" should be included in the event archive structure label 218, with "Sender" first and "Time stamp" second. The order of the event data fields may be indicated by the number entered in front of the event data field. The delimiter 304 in the example of FIG. 3 indicates that each segment of the event archive structure label 218 should be separated with an "_." FIG. 3 also depicts one embodiment of a set of event data fields 220 for one embodiment of an event 112.

Figure 4:
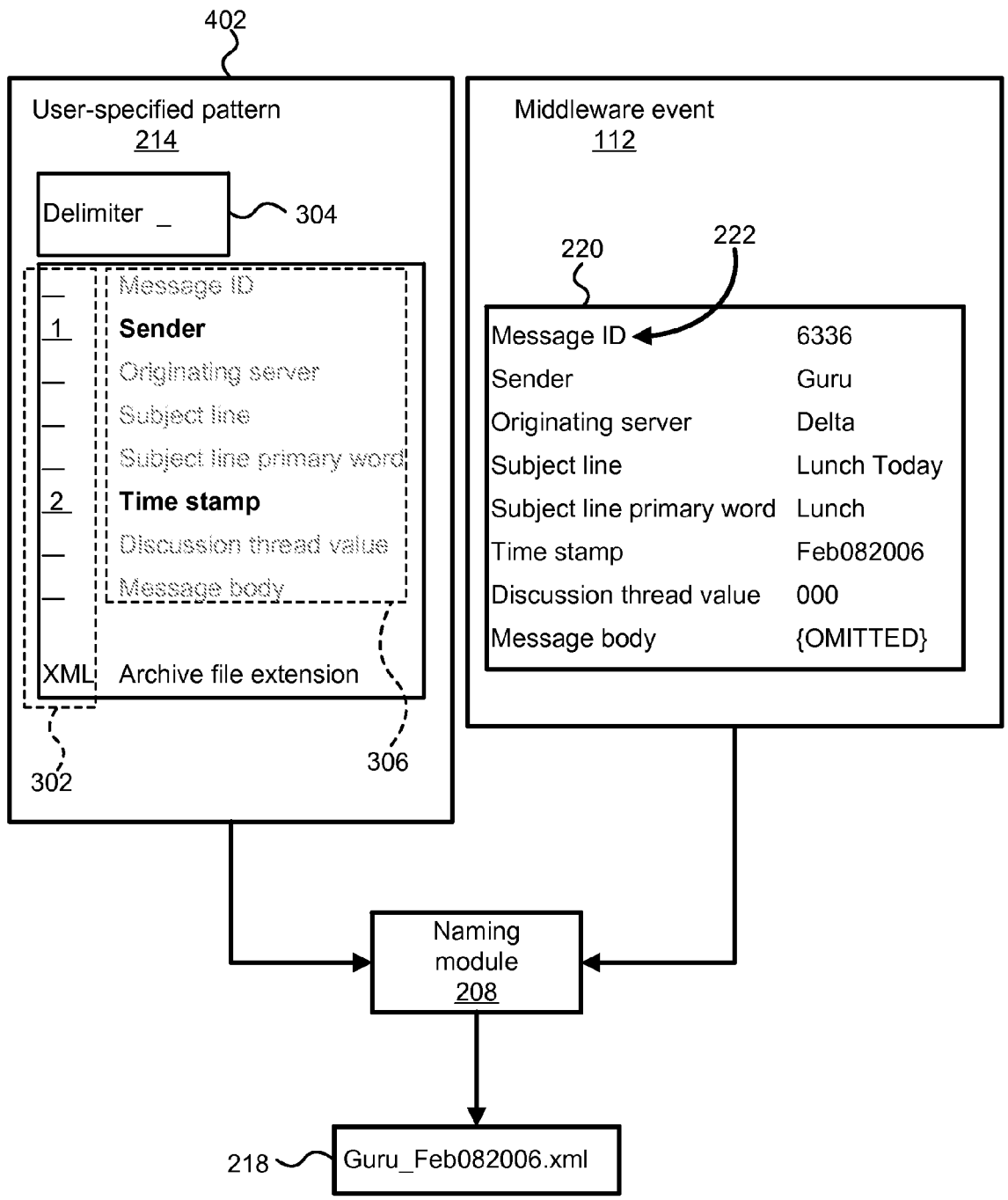
FIG. 4 is a schematic block diagram depicting one embodiment of a naming module generating an event archive structure label in accordance with the present invention.

FIG. 4 is a schematic block diagram depicting one embodiment of a naming module 208 generating an event archive structure label 218 in accordance with the present invention. In the embodiment depicted in FIG. 4, the naming module 208 utilizes the user-specified naming pattern 214 interpreted by the customization module 202 to utilize event data selected from a set of event data fields 220 to generate an event archive structure label 218.

The user-specified naming pattern 214 may comprise a pattern definition 302, a delimiter 304, and at least one event data field 306 selected from a set of event data fields 220. In one embodiment, the user-specified naming pattern 214 may comprise a graphical user interface (GUI) 402 wherein the user may enter numbers corresponding to event data fields 306 to set the pattern definition 302. The GUI 402 may further comprise a field wherein the user enters a filename extension into the pattern definition 302, and a field wherein the user enters a delimiter 304. The user may thereby quickly manipulate the user-specified naming pattern 214 and resulting event archive structure labels 218 according to the needs of the user.

In the example depicted in FIG. 4, the naming module 208 first selects the field "Sender" from the set of event data fields 220, which contains the value "Guru." The naming module 208 then inserts a delimiter 304 of "_" after the first segment of the event archive structure label 218. The naming module 208 then selects the field "Time stamp" from the set of event data fields 220 which contains the value "Feb082006." The naming module 208 then creates an event archive structure label 218, comprising an archive file name of "Guru_Feb082006.xml" according to the pattern definition 302. The labeling module 210 may then use the generated file name when creating the event archive structure 224.

Figure 5:
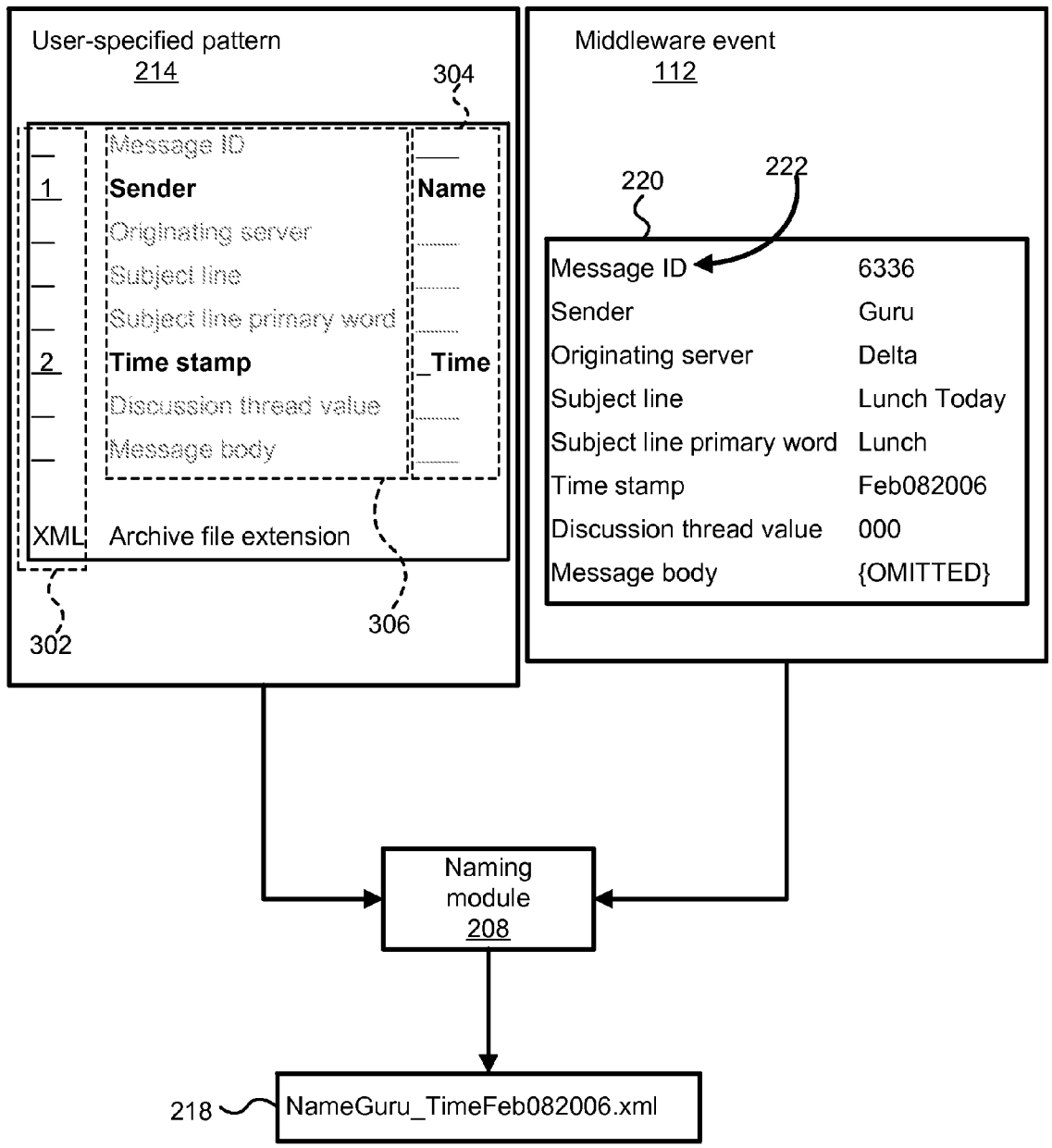
FIG. 5 is a schematic block diagram depicting an alternative embodiment of a naming module generating an event archive structure label in accordance with the present invention.

FIG. 5 is a schematic block diagram depicting an alternative embodiment of a naming module generating an event archive structure label in accordance with the present invention. In the embodiment depicted in FIG. 5, the naming module 208 utilizes the user-specified naming pattern 214 interpreted by the customization module 202 to utilize event data selected from a set of event data fields 220 to generate an event archive structure label 218.

The user-specified naming pattern 214 may comprise a pattern definition 302, a delimiter 304, and at least one event data field 306 selected from a set of event data fields 220. In the embodiment of FIG. 5, the delimiter 304 comprises a set of delimiters corresponding to each of the event data fields 306, allowing the delimiters 304 to separate segments of the event archive structure label 218 and provide information to the user reading the event archive structure label 218.

In one embodiment, the user-specified naming pattern 214 may comprise a graphical user interface (GUI) 402 wherein the user may enter numbers corresponding to event data fields 306 to set the pattern definition 302. The GUI 402 may further comprise a field wherein the user enters a filename extension into the pattern definition 302, and a set of fields wherein the user enters delimiters 304. The user may thereby quickly manipulate the user-specified naming pattern 214 and resulting event archive structure labels 218 according to the needs of the user.

In the example depicted in FIG. 5, the naming module 208 first selects the delimiter 304 for the field "Sender," comprising the word "Name," then selects the field "Sender" from the set of event data fields 220, which contains the value "Guru." The naming module 208 then inserts a delimiter 304 of "_Time" after the first segment of the event archive structure label 218. The naming module 208 then selects the field "Time stamp" from the set of event data fields 220 which contains the value "Feb082006." The naming module 208 then creates an event archive structure label 218, comprising an archive file name of "NameGuru_TimeFeb082006.xml" according to the pattern definition 302. The labeling module 210 may then use the generated file name when creating the event archive structure 224.

The schematic flow chart diagrams herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
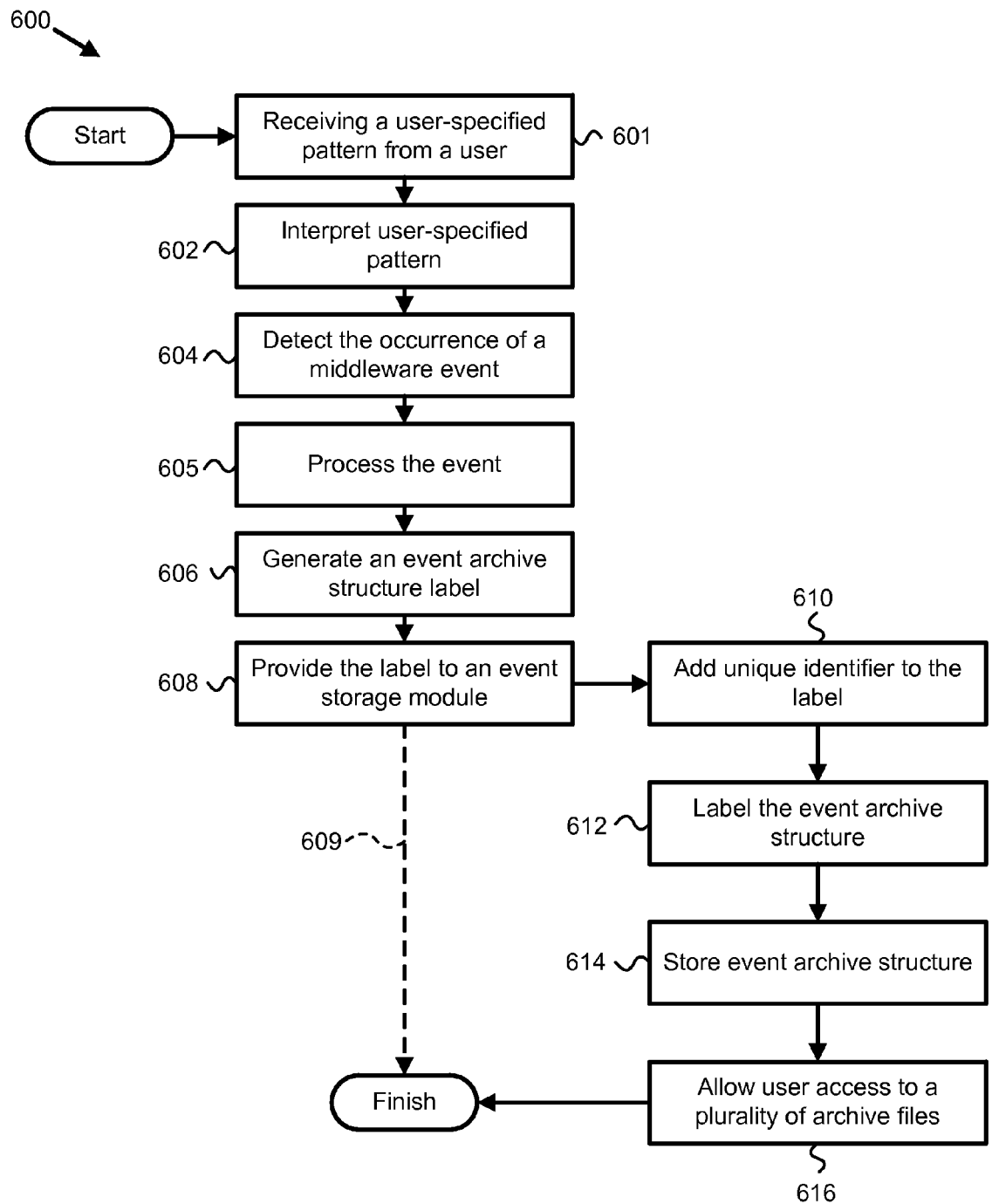
FIG. 6 is a schematic flow chart illustrating one embodiment of a method for pattern-based archiving of business events in accordance with the present invention.

FIG. 6 is a schematic flow chart illustrating one embodiment of a method 600 for pattern-based archiving of business events in accordance with the present invention. The method 600 may begin with an archive file naming tool 114 receiving 601 a user-specified naming pattern 214 from a user (not shown). The customization module 202 may then interpret 602 a user-specified naming pattern 214 for labeling event archive structures 216. In alternative embodiments, the user-specified naming pattern 214 may not be interpreted until the event is processed. The event detection module 204 may then detect 604 the occurrence of a middleware event 112 triggered by a business process 104.

The event handler module 206 may then process 605 the event 112. The event handler module 206 may comprise a middleware component. The naming module 208 may then generate 606 an event archive structure label 218 according to the user-specified naming pattern 214, where the event archive structure label 218 comprises values extracted from the set of event data fields 220 of the event 112. The naming module 608 may then provide 608 the event archive structure label 218 to an event storage module 226 for labeling of the event archive structure 224 corresponding to the event 112.

The method 600 may be carried out within a first integration adapter 106, a second integration adapter 110, or within a source application 104. In certain embodiments, providing 608 the label to an archival module 212 may comprise generating 606 the label 218, and passing the label 218 through the integration broker 102 with the event 112. The method 600 may conclude 609 with providing 608 the label 218 to an event storage module 226.

Optionally, the method 600 may continue with the event storage module 226 adding 610 a unique identifier 222 to the label 218. The addition of a unique identifier 222 may ensure that each event archive structure 224 automatically receives a unique label. Many systems already create unique identifiers 222, for example an e-mail message ID, and therefore in some embodiments it may be convenient to use a unique identifier 222 which is already available. The event storage module 226 may then label 612 the event archive structure 224 using the event archive structure label 218, and store 614 the event archive structure 224 on a memory storage 116 device as an archive file within a set of stored event archive structures 216.

The memory storage device 116 may be accessible to an operating system (not shown), and the event archive structure 224 may be accessible among the set of stored event archive structures 216 through standard file system tools such as a file explorer. Therefore, in one embodiment, the event archive structure 224 comprises an archive file accessible among a plurality of archive files using standard file system tools.

Figure 7:
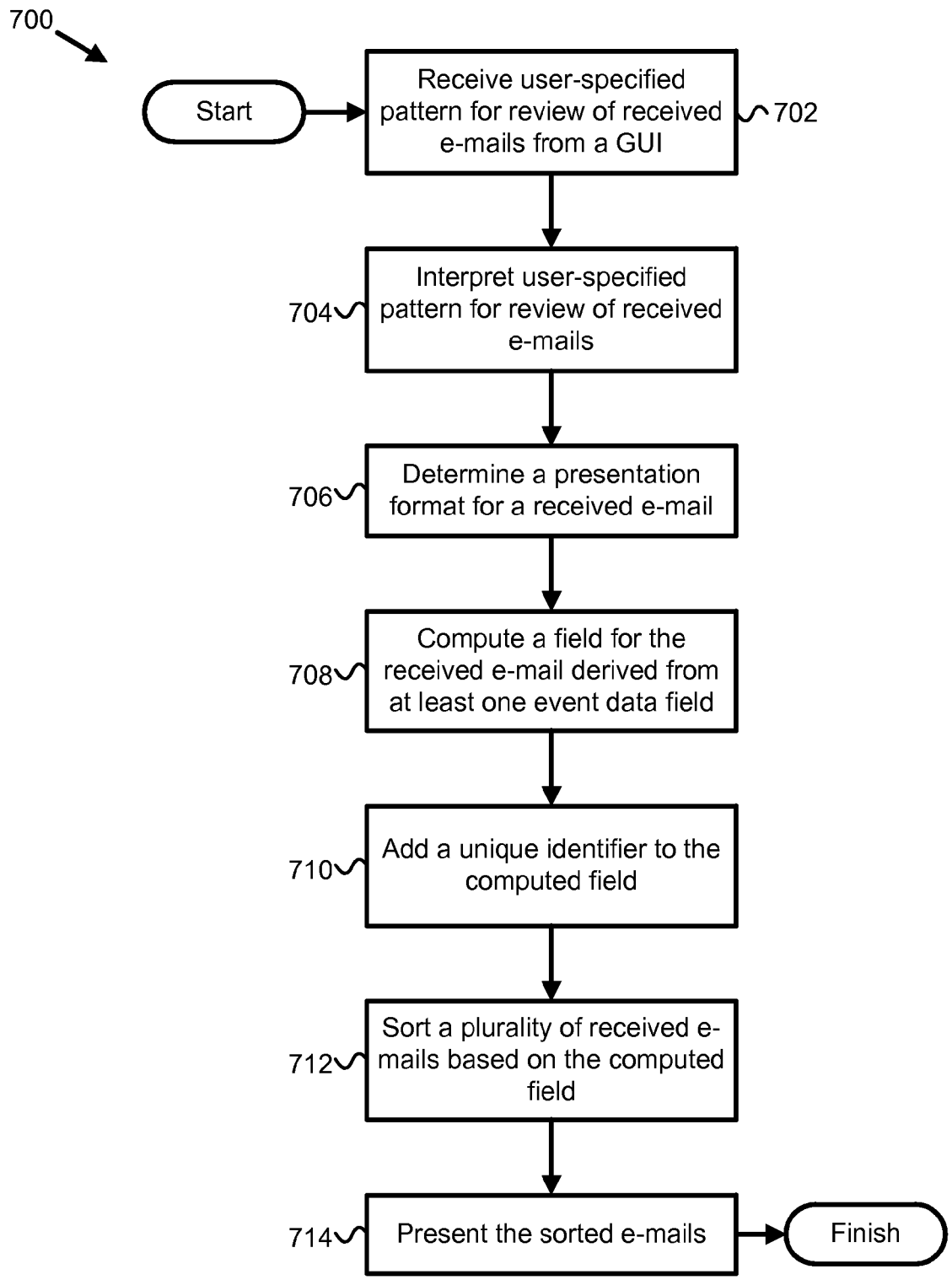
FIG. 7 is a schematic flow chart illustrating one embodiment of a method for pattern-based archiving of received e-mails in accordance with the present invention.

FIG. 7 is a schematic flow chart illustrating one embodiment of a method 700 for pattern-based archiving of received e-mails 112 in accordance with the present invention. The method 700 may begin with an archive file naming tool 114 receiving 702 a user-specified naming pattern 214 for review of received e-mails from a GUI 402. The customization module 202 may interpret 704 the user-specified naming pattern 214 for review of received e-mails 112. The naming module 208 may then determine 706 a presentation format for a received e-mail 112.

The naming module 208 may determine 706 a presentation format by determining a display order for a set of event data fields 308 of the e-mail 112. For example, if the user-specified naming pattern 214 indicates that the time stamp and message header should be displayed for reviewed e-mails 112, the naming module 208 may determine that the e-mails 112 should correspond to a presentation format where the time stamp field is displayed first, and the subject field is displayed next. In one embodiment, the archival module 212 may save the e-mails 112 in an e-mail archive folder with the event data field 306 of time stamp on the left, and the event data field of subject is the second field from the left.

Alternatively, the naming module 208 may determine 706 a presentation format by computing a field derived from the set of event data fields 220 of the e-mail 112. For example, if the user-specified naming pattern 214 indicates that the time stamp and message header should be displayed for reviewed e-mails 112, the naming module 208 may generate a structure label 218 comprising the information from the time stamp and message header fields. The naming module 208 may optionally add a unique identifier 222 to the computed field derived from the set of event data fields 220 of the e-mail 112.

In one embodiment, the archival module 212 may insert a computed field into a set of stored e-mails 112, wherein the computed field comprises the data in the generated structure label 218 for each e-mail. The archival module 212 may further be configured to highlight the computed field, which may include placing the computed field as the far left field for display, or using bold text in the highlighted field. Thus, the presentation format may comprise a computed field including a suitable structure label 218 for each associated e-mail 112, wherein the computed field is highlighted.

The event storage module 226 may sort 712 a plurality of received e-mails based on the presentation format, and present the sorted e-mails according to the presentation format. The e-mails 112 may comprise e-mails satisfying the POP3 or the IMAP protocol.

Figure 8:
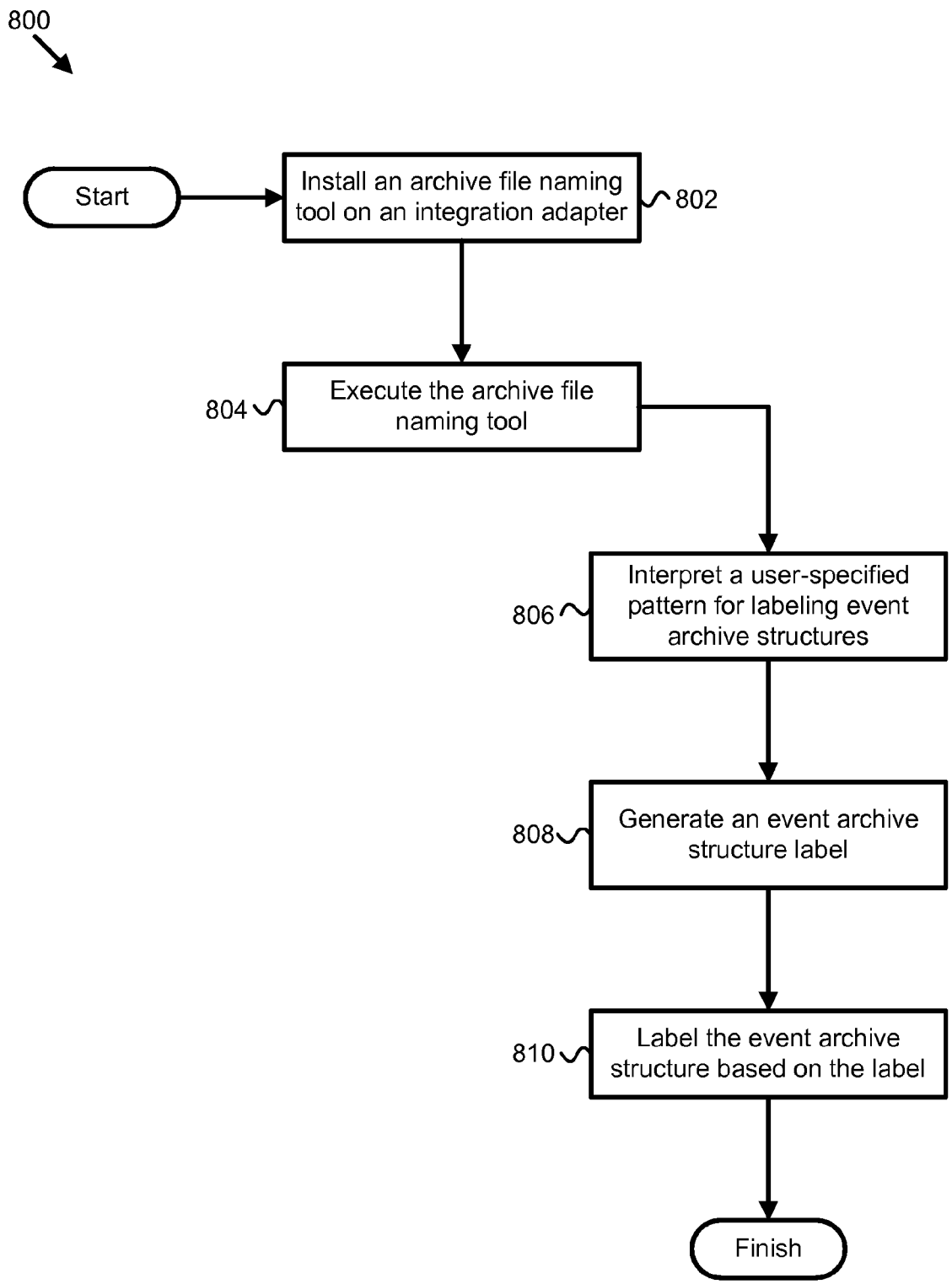
FIG. 8 is a schematic flow chart illustrating one embodiment of a method to enhance event archival in accordance with the present invention.

FIG. 8 is a schematic flow chart illustrating one embodiment of a method 800 to enhance event archival in accordance with the present invention. The method 800 may begin with a user installing 802 an archive file naming tool 114 on an integration adapter 110. The integration adapter 110 may comprise an e-mail adapter. The user may then execute 804 the archive file naming tool 114. The customization module 102 may then interpret 806 a user-specified naming pattern 214 for labeling event archive structures 216. The naming module 208 may generate 808 an event archive structure label 218 comprising event data 220. The method may conclude with the labeling module 210 labeling 810 an event archive structure 224 based on the event archive structure label 218.

From the foregoing discussion, it is clear that the invention provides a system, method, apparatus to enhance business event archival. The present invention allows a user to specify a pattern for archiving such that the archived data is presented to the user in a desired format. Using the invention, the user can quickly search archived files, e-mails, or database entries to find records of previous events for troubleshooting, data gathering, or other desired purposes. The invention overcomes previous limitations in the art by allowing the user to quickly and easily configure how business events will be archived.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for enhancing event archiving comprising:
   a customization module configured to interpret a user-specified naming pattern for labeling an event archive structure, the event archive structure comprising an archive file corresponding to a single event, the user-specified naming pattern comprising at least one event data field selected by a user from a set of event data fields for the event;
   a naming module configured to generate an event archive structure label for the event archive structure according to the user-specified naming pattern, the event archive structure label comprising a file name for the archive file, the file name comprising data of the event based on the at least one event data field selected by the user; and
   an archival module configured to store the event archive structure;
   wherein the customization module, the naming module, and the archival module comprise one or more of logic hardware and executable code, the executable code stored on a tangible computer readable storage medium.

2. The apparatus of claim 1, further comprising an event detection module configured to detect the event, and an event handler module configured to process the event.

3. The apparatus of claim 1, further comprising a labeling module configured to label the event archive structure based on the event archive structure label.

4. The apparatus of claim 1, wherein the event comprises a middleware event triggered by a business process in communication with the apparatus.

5. The apparatus of claim 1, wherein the event comprises content selected from the group comprising a business object, an e-mail, and a file.

6. The apparatus of claim 1, wherein the customization module is further configured to receive the user-specified naming pattern comprising a pattern definition, a delimiter, and the at least one event data field selected by the user.

7. The apparatus of claim 6, wherein the members of the set of event data fields are selected from the group comprising a business object name, a business object attribute, a message header field, a value calculated to identify a discussion thread relating a group of e-mail events, a primary word from a message header field, and a time stamp.

8. The apparatus of claim 1, wherein the naming module is further configured to add a unique identifier to the event archive structure label.

9. The apparatus of claim 1, wherein the naming module is further configured to add an event failure indicator to the event archive structure label for events having at least one failure.

10. The apparatus of claim 1, wherein the event archive structure label is human-readable.

11. A computer program product comprising a non-transitory computer readable storage medium storing computer usable program code executed on a processor to enhance event archiving, the program product having operations comprising:

interpreting a user-specified naming pattern for labeling an event archive structure, the event archive structure comprising an archive file corresponding to a single event, the user-specified naming pattern comprising at least one event data field selected by a user from a set of event data fields for the event;

detecting the occurrence of the event, the event comprising a a middleware event triggered by a business process;

generating an event archive structure label for the event archive structure according to the user-specified naming pattern, the event archive structure label comprising a file name for the archive file, the file name comprising event data based on the at least one event data field selected by the user; and providing the event archive structure label to an event storage module for labeling of the event archive structure corresponding to the middleware event.

12. The computer program product of claim 11, further comprising processing the event by way of a middleware component.

13. The computer program product of claim 11, further comprising labeling the event archive structure based on the event archive structure label, and storing the event archive structure.

14. The computer program product of claim 11, wherein the event comprises content selected from the group comprising a business object, an e-mail, and a file.

15. The computer program product of claim 11, wherein the archive file is accessible among a plurality of files using standard file system tools, and wherein the file name includes at least one event data field value as defined in the user-specified naming pattern.

16. The computer program product of claim 11, further comprising receiving the user-specified naming pattern, the user-specified naming pattern comprising a pattern definition, a delimiter, and the at least one event data field selected by the user.

17. The computer program product of claim 16, wherein members of the set of event data fields are selected from the group comprising a business object name, a business object attribute, a message header field, a primary word from a message header field, and a time stamp.

18. The computer program product of claim 11, further comprising adding a unique identifier to the event archive structure label.

19. The computer program product of claim 11, wherein the event comprises an e-mail satisfying the IMAP protocol.

20. A computer program product operating in relation to an integration adapter, the computer program product comprising a non-transitory computer readable storage medium storing computer usable program code executed on a processor to enhance reviewing of received e-mails, the program product having operations comprising:

interpreting a user-specified naming pattern for labeling an event archive structure for a received e-mail, the event archive structure comprising an archive file corresponding to the received e-mail, the user-specified naming pattern comprising at least one event data field of the received email selected by a user from a set of event data fields for the received email;

generating an event archive structure label for the event archive structure based on the user-specified naming pattern, the event archive structure label comprising a file name for the archive file, the file name comprising data of the received e-mail based on the at least one event data field of the received e-mail selected by the user; and storing the event archive structure of the received e-mail.

21. The computer program product of claim 20, further comprising receiving the user-specified naming pattern for the received e-mail from a graphical user interface.

22. The computer program product of claim 20, wherein the received e-mail comprises an e-mail satisfying one of the POP3 and IMAP protocols.

23. The computer program product of claim 20, wherein the at least one event data field comprises a member selected from the group including a subject, a date, a time stamp, sender information, a primary word from the subject, and a value calculated to identify a discussion thread relating a group of e-mails.

24. A system for enhancing event archival comprising:

a memory storage device;

an integration broker coupled to a source application by way of a first integration adapter, and coupled to a destination application by way of a second integration adapter;

a middleware event triggered by the source application;

wherein the second integration adapter is configured to receive the event from the integration broker, the second integration adapter comprising an archive file naming tool configured to enhance event archival, the tool comprising:

a customization module configured to interpret a user-specified naming pattern for labeling an event archive structure, the event archive structure comprising an archive file corresponding to the middleware event, the user-specified naming pattern comprising at least one event data field selected by a user from a set of event data fields for the middleware event;

an event detection module configured to detect the occurrence of the middleware event;

an event handler module configured to process the middleware event;

a naming module configured to generate an event archive structure label for the middleware event according to the user-specified naming pattern, the event archive structure label comprising a file name for the archive file, the file name comprising event data based on the at least one event data field selected by the user;

a labeling module configured to label the event archive structure based on the event archive structure label; and an archival module configured to store the event archive structure in the memory storage device.

25. The system of claim 24, wherein the middleware event comprises content selected from the group comprising a business object, an e-mail, and a file.

26. The system of claim 24, wherein the customization module is further configured to receive the user-specified naming pattern comprising a pattern definition, a delimiter, and the at least one event data field selected by the user.

27. The system of claim 26, wherein the members of the set of event data fields are selected from the group comprising a business object name, a business object attribute, a message header field, and a time stamp.

28. The system of claim 24, wherein the naming module is further configured to add a unique identifier to the event archive structure label.

29. The system of claim 24, wherein the event archive structure label is human-readable.

30. A method to enhance event archival comprising:
  installing, by use of a processor, an archive file naming tool on an integration adapter; and
  executing the archive file naming tool configured to:
    interpret a user-specified naming pattern for labeling an event archive structure, the event archive structure comprising an archive file corresponding to a single event, the user-specified naming pattern comprising at least one event data field selected by a user from a set of event data fields for the event;
    generate an event archive structure label for the event archive structure according to the user-specified naming pattern, the event archive structure label comprising a file name for the archive file, the file name comprising event data based on the at least one event data field selected by the user; and
    label the event archive structure based on the event archive structure label.

31. The method of claim 30, wherein the event comprises content selected from the group comprising a business object, an e-mail, and a file.

32. The method of claim 30, wherein the integration adapter comprises an e-mail adapter.

\* \* \* \* \*